(No Model.)

A. W. McKINNON.
SAW GUMMER.

No. 496,948. Patented May 9, 1893.

Witnesses
Harry L. Amer.
S. P. Wolhaupter

Inventor
Angus W. McKinnon.
By his Attorneys,
C. A. Snow & Co.

UNITED STATES PATENT OFFICE.

ANGUS W. McKINNON, OF BLANCHARD SPRINGS, ARKANSAS.

SAW-GUMMER.

SPECIFICATION forming part of Letters Patent No. 496,948, dated May 9, 1893.

Application filed July 14, 1892. Serial No. 440,049. (No model.)

*To all whom it may concern:*

Be it known that I, ANGUS W. McKINNON, a citizen of the United States, residing at Blanchard Springs, in the county of Union and State of Arkansas, have invented a new and useful Saw-Gummer, of which the following is a specification.

This invention relates to saw gummers and it has for its object to provide an improved saw gumming device, simple in construction and operation and yet which secures the same results in as efficient manner as complicated gumming devices.

To this end the invention primarily contemplates an improved and simple construction of gummer.

With these and many other objects in view which will readily appear as the nature of the invention is better understood, the same consists in the novel construction, combination and arrangement of parts hereinafter more fully described, illustrated and claimed.

Figure 1:
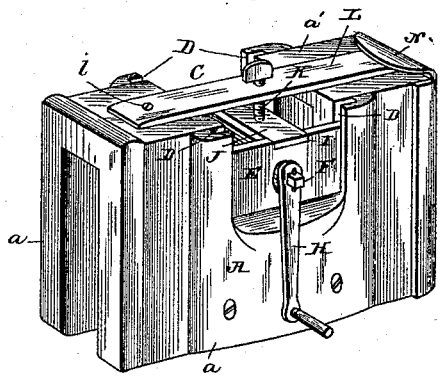
Figure 2:
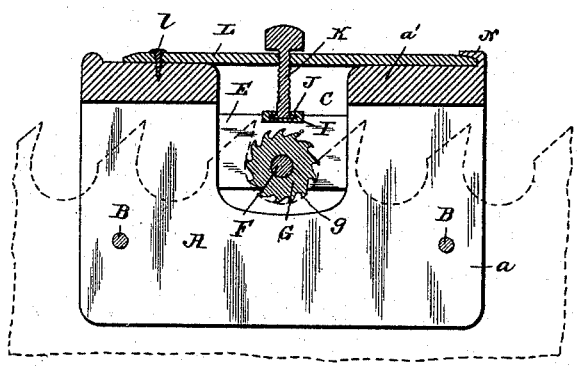
Figure 3:
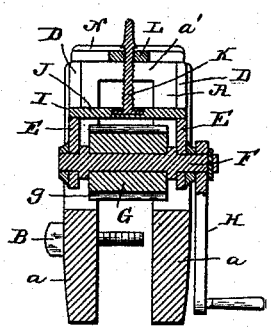
Figure 4:
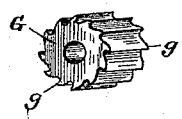

In the accompanying drawings:—Figure 1 is a perspective view of a saw gummer constructed in accordance with this invention. Fig. 2 is a vertical longitudinal sectional view of the same. Fig. 3 is a vertical transverse sectional view thereof. Fig. 4 is a detail in perspective of the gumming bit or spindle.

Referring to the accompanying drawings:— A represents the gummer body comprising the opposite depending sides $a$, and connecting top $a'$, said body being designed to straddle the saw in the usual manner, and be held in position thereon by means of the thumb screws B passing through one side of the body and impinging against the side of the saw therein. The body A is provided with the transverse slot C, cutting the sides and top of the body, and provided upon the opposite edges thereof, and upon each side $a$ of the gummer body, with the vertical guide grooves D within which are designed to move the adjustable bearing blocks or plates E. The said movable vertically adjustable bearing blocks E receive the journal ends of the tool shaft F, upon which shaft is mounted the rotary cutting disk or spindle G. The said cutting disk or spindle G is provided with a peripheral series of cutting teeth $g$, which, as the shaft F is rotated by means of the crank handle H connected to one end thereof, cut out the metal of the saw between the teeth to the requisite depth as will be readily apparent. The upper edges of the opposite adjustable bearing blocks E are provided with the notched seats I in which are designed to rest the opposite ends of the presser foot J. The said presser foot J is carried upon the lower end of the feed screw K, which screw works through the swinging feed bar L. The said feed bar L is pivoted at one end as at $l$ to the top of the body A, while the other end thereof is designed to be moved under the securing flange N located at the other end of the gummer body, and serves to hold the feed bar fixedly in position when the presser foot is resting upon the bearing blocks, so that the cutting bit or spindle can be fed by means of the screw J to cut any depth desired between the teeth, the tendency of the bar L to rise up being prevented by said securing flanges. In raising the cutting device from between the saw teeth to carry it to its next point of cut, the feed bar L is swung out from its securing flange and carries the presser foot away from the bearing plates or boxes and thus allows the same to be moved entirely from the body if desired. After one tooth is cut, it will be apparent that the cutter may be elevated by raising the presser foot above the bearing plates and swinging the same to one side as just described, so that the cutter may be brought to a position convenient for setting the gummer on the next tooth in the ordinary manner.

Having thus described my invention, what I claim, and desire to secure by Letters Patent, is—

1. In a saw gummer, the gummer body comprising opposite depending sides and a connecting top, said body being provided with a transverse open slot, and guides at the edges of said slot, a vertically adjustable cutting bit mounted in said transverse slot, connected bearings for the cutting bit arranged in said guides, feeding devices spanning the slot above said bearings, and fastening screws passing through one of said depending sides, substantially as set forth.

2. In a saw gummer, an open body having a central transverse slot open at its upper end and provided with opposite guide grooves upon the edges thereof, adjustable bearing plates or blocks moving in said guide grooves, a rotating cutting bit or spindle having its ends journaled in said adjustable blocks or plates, and a swinging feeding device adapted to be swung into a position spanning said transverse slot and adapted to work onto said bearing blocks or plates, substantially as set forth.

3. In a saw gummer, an open body having a central transverse slot open at its upper end, guide grooves at the opposite edges of said slot, and a securing flange at the top and one end thereof, adjustable bearing blocks moving in said slots, a rotating cutting spindle or bit journaled in said adjustable bearing blocks, a movable feed bar pivoted at one end to the top of said body and adapted to have the other end thereof engaged beneath said securing flange, a feed screw working through said feed bar, and a presser foot carried upon the lower end of said feed screw and bearing upon said adjustable bearing blocks, substantially as set forth.

In testimony that I claim the foregoing as my own I have hereto affixed my signature in the presence of two witnesses.

ANGUS W. McKINNON.

Witnesses:
GEORGE L. McKINNON,
CHARLES S. LOWDERBACK.